United States Patent
Onodera (10) Patent No.: US 6,796,201 B2
(45) Date of Patent: Sep. 28, 2004

(54) INPUT DEVICE PROVIDED WITH MANIPULATING MEMBER THAT SLIDES

(75) Inventor: Mikio Onodera, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 100 days.

(21) Appl. No.: 10/191,204

(22) Filed: Jul. 9, 2002

(65) Prior Publication Data

US 2003/0011569 A1 Jan. 16, 2003

(30) Foreign Application Priority Data

Jul. 11, 2001  (JP) ........................................ 2001-210548

(51) Int. Cl.[7] .......................... G05G 13/00; H01C 10/16
(52) U.S. Cl. .............................. 74/471 XY; 273/148 B; 463/38; 338/128
(58) Field of Search ........................... 74/470, 471 XY, 74/490.09, 490.1, 490.11, 523; 273/148 B; 463/38; 338/128

(56) References Cited

U.S. PATENT DOCUMENTS 5,383,735 A    1/1995  Smiley 5,552,808 A    9/1996  Hsu

FOREIGN PATENT DOCUMENTS

| EP | 1 069 488 | 1/2001 |
|---|---|---|
| WO | WO96/36915 | 11/1996 |

OTHER PUBLICATIONS

International Search Report.

*Primary Examiner*—David A. Bucci
*Assistant Examiner*—Colby Hansen
(74) *Attorney, Agent, or Firm*—Brinks Hofer Gilson & Lione (57) ABSTRACT

In an input device according to the invention, when a manipulating member slides, a sliding member slides in the same direction as the manipulating member, and respective engaging positions of first and second drive members are made changeable to enable each of the first and second drive members to shift linearly, the linear shifting of the first and second drive members enabling first and second detecting members to be operated. Accordingly, the drive members linearly shift along with the sliding of the sliding member, eliminating a need to rotate arc-shaped interlocked members in a conventional configuration and making it possible to reduce a required space in a longitudinal direction, resulting in an input device made more compact in a longitudinal dimension.

20 Claims, 9 Drawing Sheets

INPUT DEVICE PROVIDED WITH MANIPULATING MEMBER THAT SLIDES

BACKGROUND OF THE INVENTION

1. Field of the Invention

The present invention relates to an input device for use in automobile-mounted air conditioners, applicable with particular suitability to what makes the user feel a kinesthetic sense in manipulation.

2. Description of the Prior Art

Figure 15:
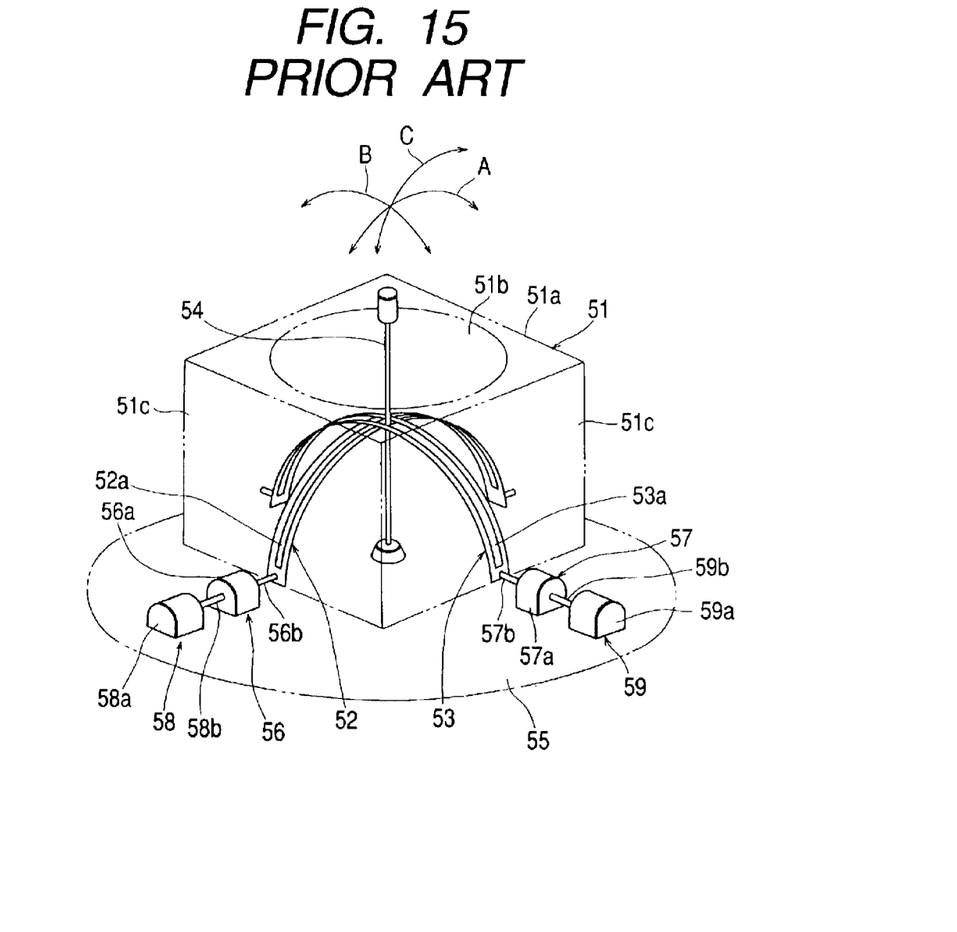
FIG. 15 shows a perspective view of an input device according to the prior art.

To describe the configuration of an input device with reference to FIG. 15, a box-shaped frame 51 has a square top plate 51a, a round hole 51b provided in this top plate 51a, and four side walls 51c bent downward from the four sides of the top plate 51a.

First and second interlocked members 52 and 53 consisting of metal plates respectively have slits 52a and 53a at the center and are arc-shaped. The two ends of the first interlocked member 52, in a state of being housed in the frame 51, are fitted to a pair of mutually opposite side walls 51c, and the first interlocked member 52 can pivot on these fitted portions.

The second interlocked member 53 is housed in the frame 51 in a state of being mutually orthogonal to and crossing the first interlocked member 52, and its two ends are fitted to the other pair of side walls 51c, and the second interlocked member 53 can pivot on these fitted portions.

A linear manipulating member 54 is pressed into the crossing slits 52a and 53a of the first and second interlocked members 52 and 53 and thereby enabled to engage with the first and second interlocked members 52 and 53. One end of it protrudes outward through the hole 51b of the frame 51 and the other is supported by a supporting member 55 arranged underneath the frame 51 to enable the manipulating member 54 to incline.

When the manipulating member 54 protruding from the hole 51b is picked and manipulated, the manipulating member 54 inclines pivoting on the portions supported by the supporting member 55 and, along with the inclination of this manipulating member 54, the first and second interlocked members 52 and 53 engaged with the manipulating member 54 rotate.

In its neutral position, the manipulating member 54 is normal to the supporting member 55, and when the manipulating member 54 in this neutral position is inclined in the direction of arrow A parallel to the slit 52a, the second interlocked member 53 engages with the manipulating member 54 and rotates.

Or when the manipulating member 54 in its neutral position is inclined in the direction of arrow B parallel to the slit 53a, the first interlocked member 52 engages with the manipulating member 54 and rotates. When the manipulating member 54 in a position midway between the direction of arrow A and that of arrow B is inclined in the direction of arrow C, both the first and second interlocked members 52 and 53 engage with the manipulating member 54 and rotate.

First and second rotarily manipulated electrical parts 56 and 57, each consisting of a rotary sensor or the like, respectively have bodies 56a and 57a and rotation shafts 56b and 57b rotatably fitted to the bodies 56a and 57a.

The first and second rotarily manipulated electrical parts 56 and 57 are fitted to the supporting member 55 on the same plane, and the rotation shaft 56b of the first rotarily manipulated electrical part 56, coupled to one end of the first interlocked member 52, rotates along with the rotation of the first interlocked member 52 and the first rotarily manipulated electrical part 56 is thereby manipulated.

The rotation shaft 57b of the second rotarily manipulated electrical part 57, coupled to one end of the second interlocked member 53, rotates along with the rotation of the second interlocked member 53 and the second rotarily manipulated electrical part 57 is thereby manipulated.

The first and second rotarily manipulated electrical parts 56 and 57 detect the inclined position of the manipulating member 54.

First and second motors 58 and 59 respectively have bodies 58a and 59a and rotation shafts 58b and 59b fitted rotatably to these bodies 58a and 59a.

The first and second motors 58 and 59 are fitted to the supporting member 55 on the same plane. As the rotation shaft 58b of the first motor 58 is coupled to the rotation shaft 56b of the first rotarily manipulated electrical part 56, the turning force of the first motor 58 is transmitted to the rotation shaft 56b via the rotation shaft 58b and, as the rotation shaft 59b of the second motor 59 is coupled to the rotation shaft 57b of the second rotarily manipulated electrical part 57, the turning force of the second motor 59 is transmitted to the rotation shaft 57b via the rotation shaft 59b.

Next, the operation of the conventional input device having the above-described configuration will be explained. First, when the manipulating member 54 is inclined, along with the rotations of the first and second interlocked members 52 and 53, the rotations of the first and second interlocked members 52 and 53 respectively cause the rotation shafts 56b and 57b to turn and the first and second rotarily manipulated electrical parts 56 and 57 to be operated, and the inclined position of the manipulating member 54 is detected.

When the manipulating member 54 is inclined, a signal is sent to the first and second motors 58 and 59 from a controller (not shown) to drive the first and second motors 58 and 59, and this driving force is transmitted to the rotation shafts 56b and 57b of the first and second rotarily manipulated electrical parts 56 and 57.

Then, the driving force of the first and second motors 58 and 59 acts as a reactionary force (kinesthetic sense or haptic sense) to the inclining motion of the manipulating member 54.

The input device according to the prior art involves the problem that, because the first and second interlocked members 52 and 53 are arc-shaped and rotate, the first and second interlocked members 52 and 53 occupy a large space in the longitudinal direction and accordingly the device tends to be large in the longitudinal dimension.

There is another problem that, as the axial directions of the rotation shafts 56b and 57b of the first and second rotarily manipulated electrical parts 56 and 57 and of the rotation shafts 58b and 59b of the first and second motors 58 and 59 are the same as and moreover are continuous from the extending directions of the first and second interlocked members 52 and 53, the rotarily manipulated electrical parts 56 and 57 and the motors 58 and 59 occupy a large installation space in the lateral direction and accordingly the device tends to be large in the lateral dimension.

SUMMARY OF THE INVENTION

In view of these problems, the present invention is intended to provide a compact and inexpensive input device reduced in longitudinal and lateral dimensions.

As a first means to solve the problems noted above, there is proposed a configuration provided with a manipulating member slidable in any direction in a full 360-degree range from its initial position, a sliding member slidable together with the manipulating member on a plane normal to an axial direction of the manipulating member, at least a pair of first and second drive members linearly slidable along with motion of the sliding member and arranged at a right angle to each other, and first and second detecting members respectively operated by the first and second drive members, wherein, during sliding of the manipulating member, the sliding member slides in the same direction as the manipulating member, the sliding member can alter their respective engaging positions with the first and second drive members to enable each of the first and second drive members to shift linearly, and the linear shifting of the first and second drive members enables the first and second detecting members to be operated.

Since, in this configuration, the drive members linearly shift along with the sliding of the sliding member, the need to rotate arc-shaped interlocked members in the conventional configuration is eliminated, making it possible to reduce the required space in the longitudinal direction and therefore resulting in an input device made more compact in the longitudinal dimension.

As a second means to solve the problems noted above, there is proposed a configuration wherein the sliding member has a planar part and a pair of first engaging means arranged at a right angle to each other, the sliding member is slid as a top and a bottom of the planar part are guided by a guiding member, second engaging means provided on each of the first and second drive members engage with each of the first engaging means, and each of the first and second drive members shifts linearly enabling the second engaging means to alter their respective engaging positions with the first engaging means.

This enables a configuration in which the drive members to linearly shift along with the sliding motion of the sliding member to be easily realized, resulting in enhanced productivity and reduced cost.

As a third means to solve the problems noted above, there is proposed a configuration wherein the first engaging means are formed of a pair of slits provided on the planar part and extending at a right angle to each other, the first and second drive members are arranged extending at a right angle to the slits, the second engaging means provided on the drive members are formed of stubs engaging with the slits, and each of the first and second drive members linearly shifts enabling the stubs to alter their respective engaging positions with the slits.

This enables a configuration to be as simple as merely engaging stubs with slits, and accordingly an arrangement to allow the drive members to linearly shift along with the sliding motion of the sliding member to be easily realized, resulting in enhanced productivity and reduced cost.

As a fourth means to solve the problems noted above, there is proposed a configuration wherein the first engaging means are formed of a pair of rod-shaped guide rails provided on the planar part and extending at a right angle to each other, the first and second drive members are arranged extending at a right angle to the guide rails, the second engaging means provided on the drive members are formed of holds for holding the guide rails, and each of the first and second drive members linearly shifts enabling the holds to alter their respective engaging positions with the guide rails.

This enables a configuration to be as simple as making holds hold guide rails, and accordingly an arrangement to allow the drive members to linearly shift along with the sliding motion of the sliding member to be easily realized, resulting in enhanced productivity and reduced cost.

Further, the use of the guide rails serves to smoothen the alteration of the engaging positions, resulting in an easier-to-manipulate device.

As a fifth means to solve the problems noted above, there is proposed a configuration wherein the planar part has a plurality of holes, into which balls are inserted, and the balls cause the planar part to slide while remaining in contact with the guiding member.

This configuration serves to smoothen the sliding motion of the sliding member, resulting in an easier-to-manipulate device.

As a sixth means to solve the problems noted above, there is proposed a configuration further provided with regulating means for causing the first and second drive members to linearly shift.

This enables a configuration in which the drive members to linearly shift more reliably, resulting in a device more reliable in operation.

As a seventh means to solve the problems noted above, there is proposed a configuration wherein the detecting members have linearly manipulated electric parts, and manipulable parts of the linearly manipulated electric parts are linearly manipulated by linear shifting of the drive members.

This configuration can provide an input device wherein the manipulable parts of linearly manipulated electric parts can be linearly manipulated by the linear shifting of the drive members.

As an eighth means to solve the problems noted above, there is proposed a configuration wherein the detecting members have rotarily manipulated electrical parts, and rotation shafts of the rotarily manipulated electrical parts are rotationally manipulated by the linear shifting of the drive members.

This configuration can provide an input device wherein the rotation shafts of rotarily manipulated electrical parts cab be rotationally manipulated by the linear shifting of the drive members.

As a ninth means to solve the problems noted above, there is proposed a configuration wherein teeth provided on the drive members are meshed with gears fitted to the rotation shafts, and the teeth rotate the rotation shafts via the gears.

This configuration can provide an input device wherein the manipulation of the rotarily manipulated electrical parts can be made more dependable.

As a tenth means to solve the problems noted above, there is proposed a configuration wherein a motor to transmit a kinesthetic sense to the manipulating member is provided, matching each of the first and second drive members.

This configuration can provide an input device giving a kinesthetic sense to the manipulating member.

As an eleventh means to solve the problems noted above, there is proposed a configuration wherein a gear fitted to each of the rotation shafts of the motors is engaged with each of the teeth provided on the first and second drive members, and a kinesthetic sense is transmitted to the manipulating member via the gears, the drive members and the sliding member.

This configuration can provide a simple input device in which a kinesthetic sense can be dependably transmitted to the manipulating member.

As a twelfth means to solve the problems noted above, there is proposed a configuration further provided with a casing, wherein the manipulating members protrude from a front wall of the casing, and the detecting members and the motors are housed in the casing.

This configuration can provide a more compact input device in which the detecting member and motors are housed in the casing.

As a thirteenth means to solve the problems noted above, there is proposed a configuration wherein the detecting members and the motors are arranged in a lower part of the sliding member.

This configuration can provide an even more compact input device because the detecting members and the motors are arranged in the lower part of the sliding member.

As a fourteenth means to solve the problems noted above, there is proposed a configuration wherein the motors are arranged in a state in which axes of the motors are arranged at a right angle to extending directions of the drive members.

This configuration can provide an input device reduced in the installation space of motors in the lateral direction and more compact in the lateral direction than devices according to the prior art.

DETAILED DESCRIPTION OF THE PREFERRED EMBODIMENTS

Figure 1:
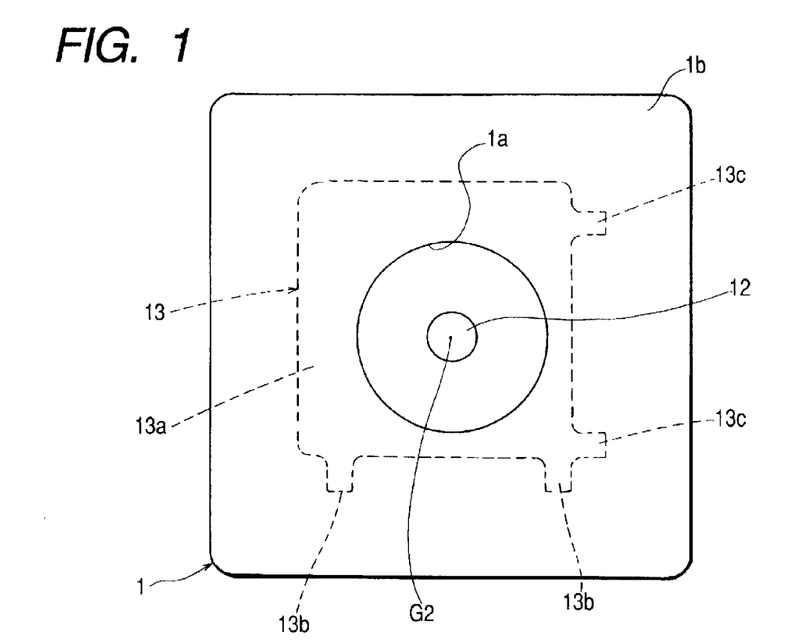
FIG. 1 is a plan of an input device, which is a first preferred embodiment of the present invention.
Figure 2:
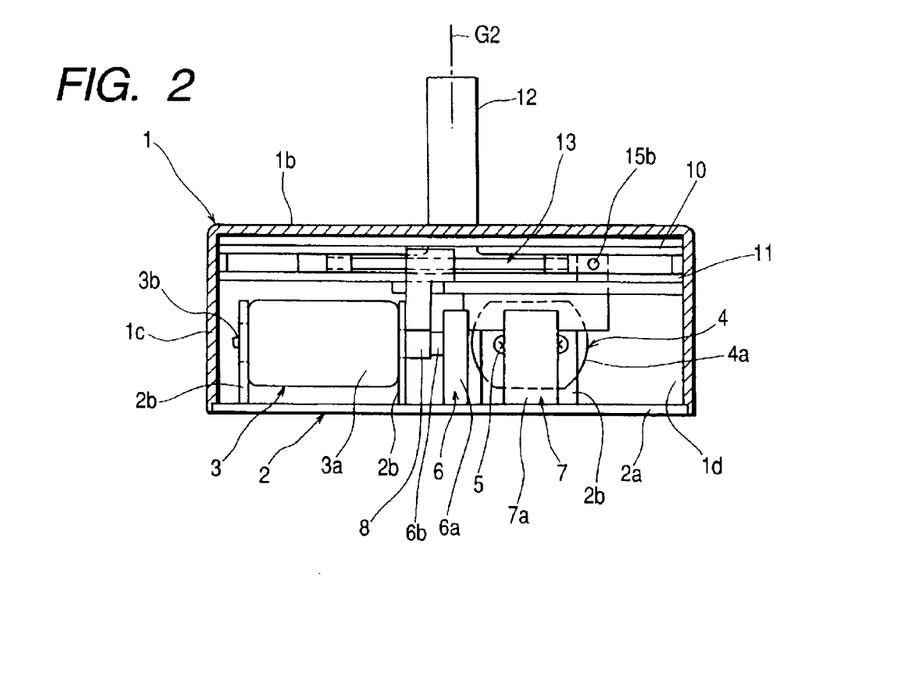
FIG. 2 shows a front view of the input device, which is the first preferred embodiment of the invention, with the inside revealed by cutting open a side wall of the casing.
Figure 3:
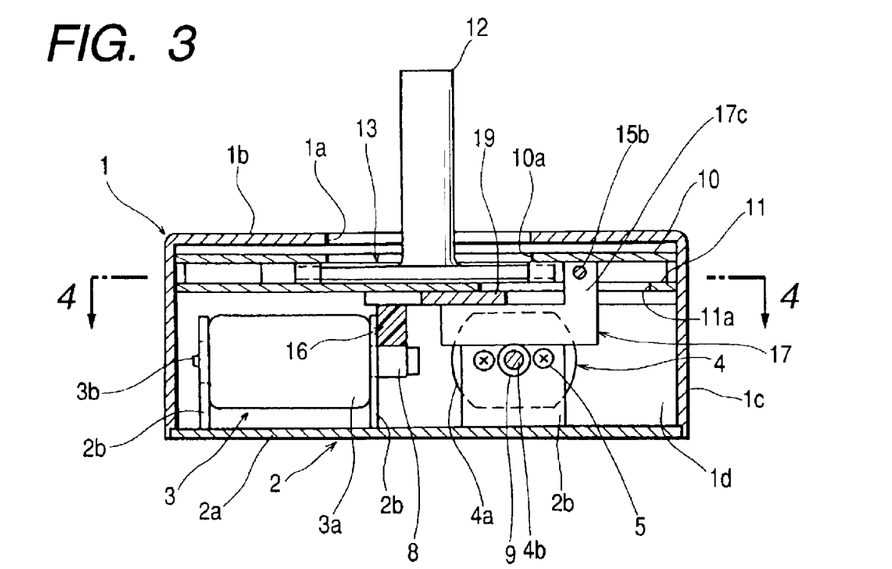
FIG. 3 shows a frontal section of the essential part of the input device, which is the first preferred embodiment of the invention.
Figure 4:
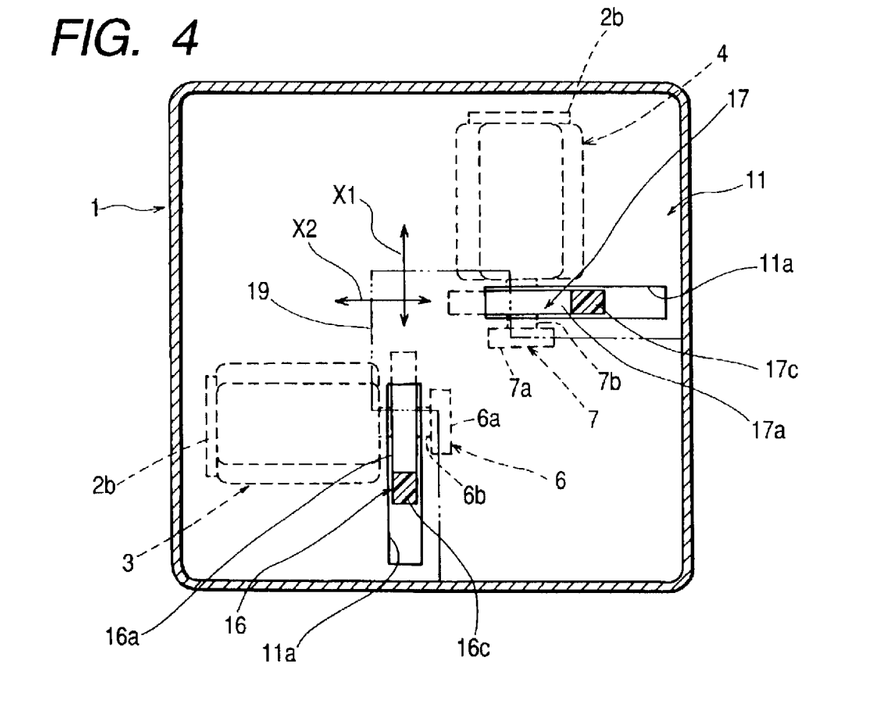
FIG. 4 shows a section along line 4—4 in FIG. 3.
Figure 5:
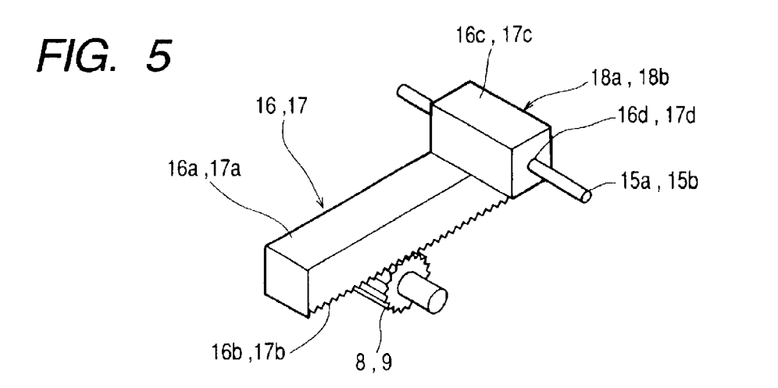
FIG. 5 shows a perspective view of the state of drive members and gears in the input device, which is the first preferred embodiment of the invention.
Figure 6:
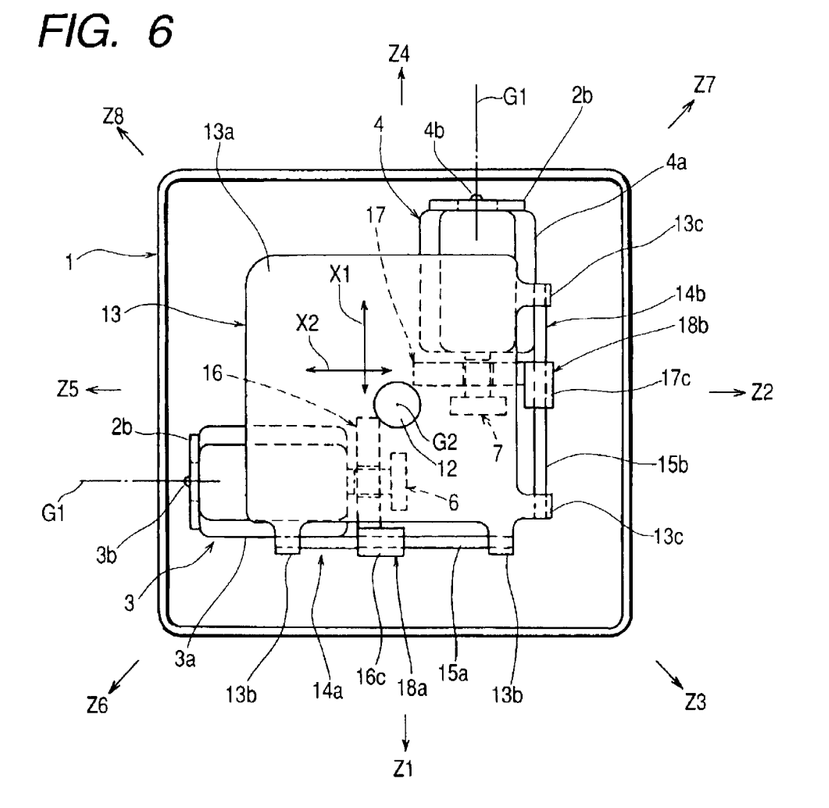
FIG. 6 illustrates the state of a sliding member, a detecting member and a motor in the input device, which is the first preferred embodiment of the invention.

To explain drawings of an input device according to the present invention, FIG. 1 is a plan of an input device, which is a first preferred embodiment of the invention; FIG. 2 shows a front view of the input device, which is the first embodiment of the invention, with the inside revealed by cutting open a side wall of the casing; FIG. 3 shows a frontal section of the essential part of the input device, which is the first embodiment of the invention; FIG. 4 shows a section along line 4—4 in FIG. 3; FIG. 5 shows a perspective view of the state of drive members and gears in the input device, which is the first embodiment of the invention; and FIG. 6 illustrates the state of a sliding member, a detecting member and a motor in the input device, which is the first embodiment of the invention.

Figure 7:
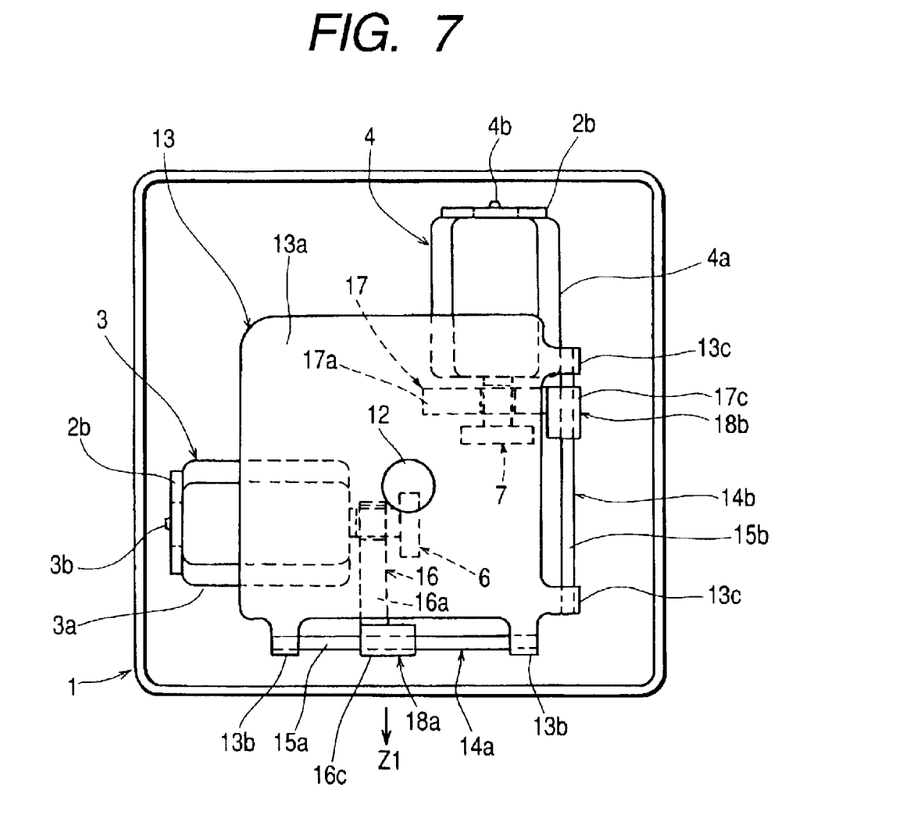
FIG. 7 illustrates the operation in a state in which a manipulating member is slid downward (in the direction of arrow Z1) in the input device, which is the first preferred embodiment of the invention.
Figure 8:
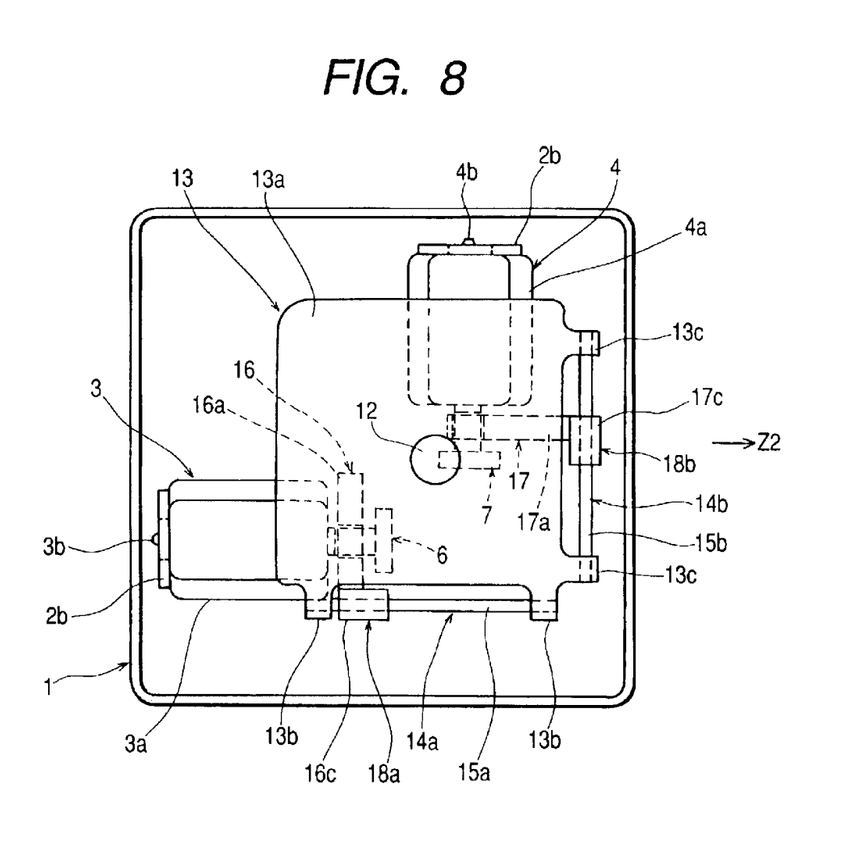
FIG. 8 illustrates the operation in a state in which the manipulating member is slid rightward (in the direction of arrow Z2) in the input device, which is the first preferred embodiment of the invention.
Figure 9:
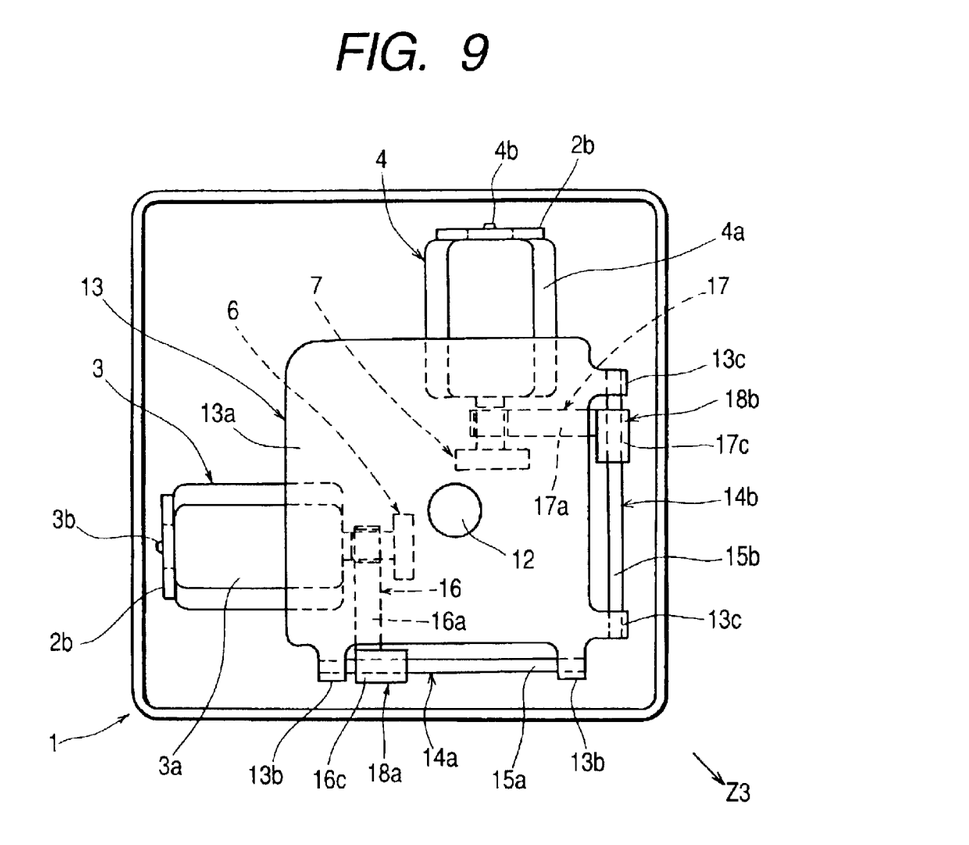
FIG. 9 illustrates the operation in a state in which the manipulating member is slid obliquely (in the direction of arrow Z3) in the input device, which is the first preferred embodiment of the invention.

FIG. 7 illustrates the operation in a state in which a manipulating member is slid downward (in the direction of arrow Z1) in the input device, which is the first embodiment of the invention; FIG. 8 illustrates the operation in a state in which the manipulating member is slid rightward (in the direction of arrow Z2) in the input device, which is the first embodiment of the invention; and FIG. 9 illustrates the operation in a state in which the manipulating member is slid obliquely (in the direction of arrow Z3) in the input device, which is the first embodiment of the invention.

Figure 10:
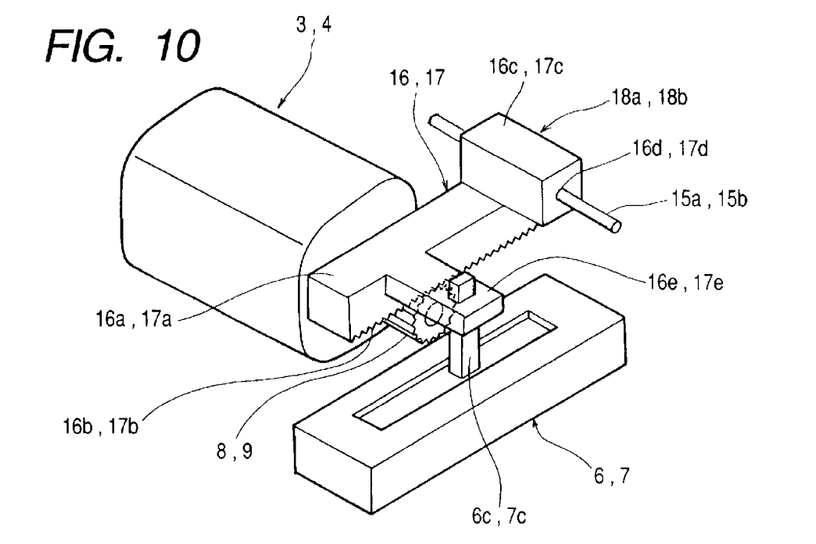
FIG. 10 is a perspective view of the essential part of an input device, which is a second preferred embodiment of the invention, showing the relationship between a drive member and a detecting member.
Figure 11:
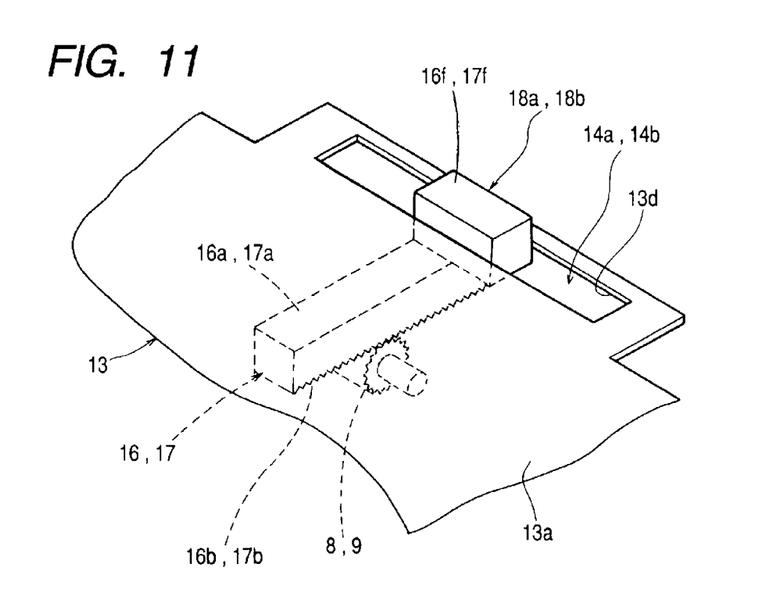
FIG. 11 is a perspective view of the essential part of an input device, which is a third preferred embodiment of the invention, showing the relationship between a sliding member and a drive member.
Figure 12:
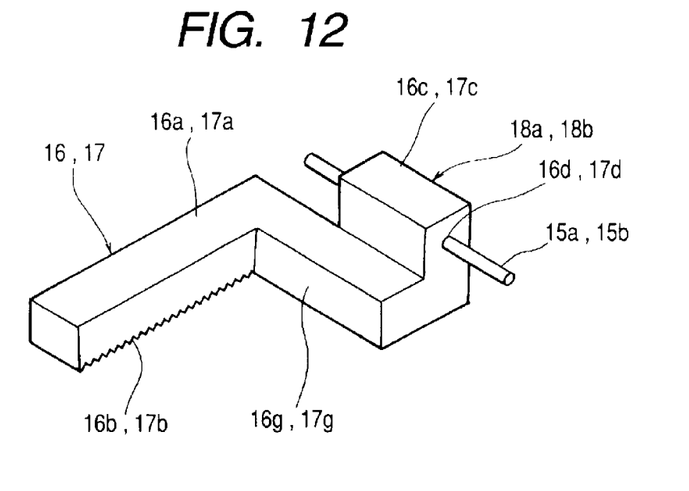
FIG. 12 is a perspective view of the essential part of an input device, which is a fourth preferred embodiment of the invention, showing a drive member.
Figure 13:
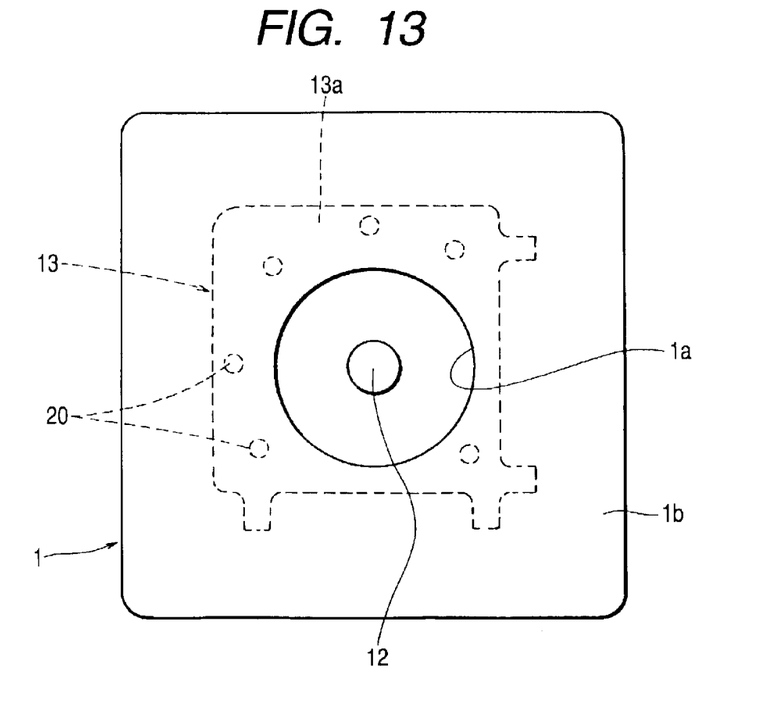
FIG. 13 is a plan of an input device, which is a fifth preferred embodiment of the invention.
Figure 14:
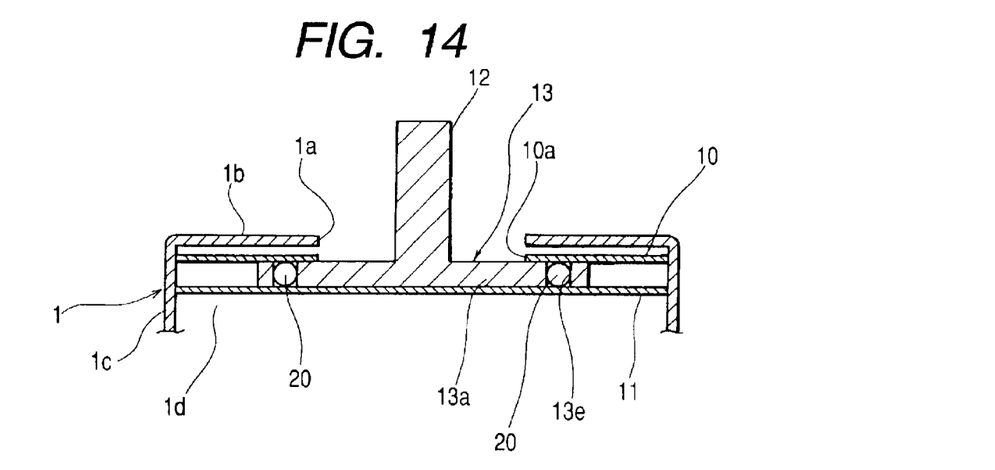
FIG. 14 shows a section the essential part of the input device, which is the fifth preferred embodiment of the invention.

Further, FIG. 10 is a perspective view of the essential part of an input device, which is a second preferred embodiment of the invention, showing the relationship between a drive member and a detecting member; FIG. 11 is a perspective view of the essential part of an input device, which is a third preferred embodiment of the invention, showing the relationship between a sliding member and a drive member; FIG. 12 is a perspective view of the essential part of an input device, which is a fourth preferred embodiment of the invention, showing a drive member; FIG. 13 is a plan of an input device, which is a fifth preferred embodiment of the invention; and FIG. 14 shows a section the essential part of the input device, which is the fifth embodiment of the invention.

Explained next is the configuration of the input device, which is the first embodiment of the invention with reference to FIG. 1 through FIG. 9, a box-shaped casing 1 formed of a synthetic resin molded product or by bending a metal plate has a square front wall 1b having a round hole 1a, four side walls 1c bent from the four sides of this front wall 1b and extending backward, and an accommodation space 1d formed within the front wall 1b and the side walls 1c surrounding it.

A supporting member 2 formed of a synthetic resin molded product or the like has a bottom wall 2a consisting of a flat plate and two pairs of supports 2b protruding upward from this bottom wall 2a.

This supporting member 2, in a state in which the supports 2b are positioned within the accommodation space 1d of the casing 1, is fitted to the rear part of the casing 1 to block the rear open part of the casing 1.

First and second motors 3 and 4 respectively have bodies 3a and 4a and rotation shafts 3b and 4b fitted rotatably to these bodies 3a and 4a.

The first motor 3 is positioned within the accommodation space 1d, and the front and rear sides of the body 3a are hooked onto one pair of the supports 2b and screwed on with bolts 5 to be fitted to the supporting member 2. The second motor 4, like the first motor 3, is positioned within the accommodation space 1d, and the front and rear sides of the body 4a are hooked onto the other pair of the supports 2b and screwed on with bolts 5 to be fitted to the supporting member 2.

When the first and second motors 3 and 4 are fitted, as shown in FIG. 6, the axes G1 of the rotation shafts 3b and 4b are arranged at a right angle to each other.

First and second detecting members 6 and 7, consisting of rotary sensors such as encoders or rotary variable resistors respectively have bodies 6a and 7a and rotation shafts 6b and 7b fitted rotatably to these bodies 6a and 7a.

The first detecting member 6, in a state of being positioned within the accommodation space 1d, is fitted to the supporting member 2, and its rotation shaft 6b is formed coaxially and integrally with the rotation shaft 3b of the first motor 3. The second detecting member 7, like the first detecting member 6, in a state of being positioned within the accommodation space 1d, is fitted to the supporting member 2 and its rotation shaft 7b is formed coaxially and integrally with the rotation shaft 4b of the second motor 4.

This configuration enables the turning forces of the respective rotation shafts 6b and 7b of the first and second detecting members 6 and 7 to be transmitted to the respective rotation shafts 3b and 4b of the first and second motors 3 and 4, and the turning forces of the respective rotation shafts 3b and 4b of the first and second motors 3 and 4 to be transmitted to the respective rotation shafts 6b and 7b of the first and second detecting members 6 and 7.

Furthermore, it is so disposed that the first and second detecting members 6 and 7 be manipulated when the rotation shafts 6b and 7b are turned.

Although the rotation shafts of the motors and those of the detecting members in this embodiment of the invention are described to be coaxially and integrally formed, it is also acceptable to transmit the turning forces of the rotation shafts of the detecting members to those of the rotation shafts of the motors or vice versa by composing the rotation shafts of the motors and of the detecting member as separate parts and coupling the separate rotation shafts through coupling members or by fitting a gear to each of the rotation shafts composed of separate parts and engaging the matching gears.

First and second gears 8 and 9 are respectively fitted to the rotation shafts 6b and 7b of the first and second detecting members 6 and 7, and the rotations of these first and second gears 8 and 9 enable the first and second detecting members 6 and 7 to be manipulated.

First and second guiding members 10 and 11 are formed of flat boards. The first guiding member 10 on the one hand has a round hole 10a at the center, while the second guiding member 11 on the other hand, as shown in FIG. 4 in particular, has regulating means 11a consisting of thin and long slits extending in directions at a right angle to each other.

These first and second guiding members 10 and 11, in a state in which the first guiding member 10 is positioned forward, are arranged at a prescribed distance from each other in the accommodation space 1d within the casing 1 and fitted to the casing 1.

When they are fitted, the first and second guiding members 10 and 11 are parallel to the front wall 1b.

It is also acceptable to dispense with the first guiding member 10 and use the front wall 1b as a guiding member.

A manipulating member 12 is formed in a rod shape, and at the rear end of this manipulating member 12 is fitted a planar sliding member 13 in a state in which it is positioned on a plane in a direction normal to the axis G2 of the manipulating member 12.

This sliding member 13 has a planar part 13a and a pair of first engaging means 14a and 14b provided in directions at a right angle to each other.

This first engaging means 14a, as shown in FIG. 6 in particular, is configured of a pair of projections 13b protruding from one side of the planar part 13a at a distance from each other and rod-shaped guide rails 15a fitted between these projections 13b, while the first engaging means 14b is configured of a pair of projections 13c protruding from another side of the planar part 13a in a position at a right angle to the side of the projections 13b and rod-shaped guide rails 15b fitted between these projections 13c.

The sliding member 13 configured as described above is fitted in a state in which its planar part 13a is arranged between the first and second guiding members 10 and 11 and held between them, while the manipulating member 12 protrudes forward through the hole 10a of the first guiding member 10 and the hole 1a of the front wall 1b.

When the sliding member 13 is fitted, its planar part 13a is made slidable guided by the first and second guiding members 10 and 11, and the manipulating member 12 can slide around the axis G2 in any direction in the full 360-degree range.

Thus, the manipulating member 12 can slide within the range of the hole 1a of the front wall 1b or within the range of the hole 10a of the first guiding member 10. When the manipulating member 12 slides, along with this sliding action the sliding member 13 slides guided by the first and second guiding members 10 and 11, and underneath this sliding member 13 are arranged the first and second detecting members 6 and 7 and the first and second motors 3 and 4.

The first and second drive members 16 and 17 made of a synthetic resin molded product or the like, as shown in FIG. 5 in particular, respectively have linearly extending arms 16a and 17a, teeth 16b and 17b provided on the back side of these arms 16a and 17a, holds 16c and 17c protruding upward at a right angle from one end each of the arms 16a and 17a, and holes 16d and 17d provided at the respective centers of these holds 16c and 17c.

These holds 16c and 17c constitute second engaging means 18a and 18b.

The first drive member 16, the arm 16a is arranged at a right angle to the axis G1 of the first motor 3 and fitted by the guide rails 15a pressed through the hole 16d of the hold 16c to engage the first engaging means 14a and the second engaging means 18a with each other.

When this first drive member 16 is fitted, the tooth 16b is meshed with a first gear 8 and the hold 16c is pressed through a slit, which is one of the regulating means 11a, to enable the first drive member 16 to be guided by the regulating means 11a to shift in the linear direction of arrow X1 at a right angle to the axis G1 of the first motor 3.

This linear shift of the tooth 16b causes the first gear 8 to turn, resulting in the turning of the rotation shaft 6b to operate the first detecting member 6.

When the second drive member 17 is fitted, the tooth 17b is meshed with a second gear 9 and the hold 17c is pressed through a slit, which is the other of the regulating means 11a, to enable the second drive member 17 to be guided by the regulating means 11a to shift in the linear direction of arrow X2 at a right angle to the axis G1 of the second motor 4.

This linear shift of the tooth 17b causes the second gear 9 to turn, resulting in the turning of the rotation shaft 7b to operate the second detecting member 7.

When the first and second drive members 16 and 17 are fitted, their respective arms 16a and 17a are at a right angle to each other, and the tips of their arms 16a and 17a extend toward the center of the casing 1.

An anti-rising member 19, formed of a planar member, is arranged between the arms 16a and 17a of the first and second drive members 16 and 17 and the second guiding member 11.

This anti-rising member 19 prevents the arms 16a and 17a from rising forward to secure the meshing of the teeth 16b and 17b with the first and second gears 8 and 9.

Next, the operation of the input device according to the present invention having the above-described configuration will be explained. First, the manipulating member 12 is slid from its initial position (neutral state), shown in FIG. 6, in the direction of arrow Z1 (the direction in which the arm 16a of the first drive member 16 extends), and the sliding member 13 and the first engaging means 14a and 14b also slide along with the sliding of the manipulating member 12 as shown in FIG. 7.

In this process, the first drive member 16 linearly shifts in the direction of arrow X1 as the hold 16c, which is the second engaging means 18a, is pulled by the guide rails 15a, which are the first engaging means 14a.

Then, the tooth 16b of the first drive member 16 shifts, and the first gear 8 is thereby turned to enable the first detecting member 6 to be operated.

The second drive member 17 on the other hand does not linearly shift in the direction of arrow X2, but only the hold 17c, which is the second engaging means 18b, and the guide rails 15b, which are the first engaging means 14b, change in their engaging position, with the result that the second detecting member 7 is not operated.

Then, the manipulating member 12 is slid from its initial position (neutral state), shown in FIG. 6, in the direction of arrow Z2 (the direction in which the arm 17a of the second drive member 17 extends), the sliding member 13 and the first engaging means 14a and 14b also slide along with the sliding of the manipulating member 12 as shown in FIG. 8.

In this process, the second drive member 17 linearly shifts in the direction of arrow X2 as the hold 17c, which is the second engaging means 18b, is pulled by the guide rails 15b, which are the first engaging means 14b.

Then, the tooth 17b of the second drive member 17 shifts, and the second gear 9 is thereby turned to enable the second detecting member 7 to be operated.

The first drive member 16 on the other hand does not linearly shift in the direction of arrow X1, but only the hold 16c, which is the second engaging means 18a, and the guide rails 15a, which are the first engaging means 14a, change in their engaging position, with the result that the first detecting member 6 is not operated.

Next, when the manipulating member 12 in the initial position shown in FIG. 6 is slid in the direction of arrow Z3, midway between the directions of arrows Z1 and Z2, the sliding member 13 and the first engaging means 14a and 14b also slide along with the sliding of the manipulating member 12 as shown in FIG. 9.

In this process, the holds 16c and 17c, which respectively are the second engaging means 18a and 18b of the first and second drive members 16 and 17, are both pulled by the guide rails 15a and 15b, which respectively are the first engaging means 14a and 14b.

Then the first drive member 16 shifts in the direction of arrow X1 while the second engaging means 18a alters the position of its engagement with the first engaging means 14a, the second drive member 17 shifts in the direction of arrow X2 while the second engaging means 18b alters the position of its engagement with the first engaging means 14b.

As a result, the first and second gears 8 and 9 are turned by the teeth 16b and 17b and both the first and second detecting members 6 and 7 are enabled to be operated at the same time.

Next, when the manipulating member 12 in the initial state shown in FIG. 6 is slid in the direction of arrow Z4, the first detecting member 6 is operated in the same way as described above with reference to FIG. 7, but the second detecting member 7 is not enabled to operate.

Next, when the manipulating member 12 in the initial state shown in FIG. 6 is slid in the direction of arrow Z5, the second detecting member 7 is operated in the same way as described above with reference to FIG. 8, but the first detecting member 6 is not enabled to operate.

Next, when the manipulating member 12 in the initial state shown in FIG. 6 is slid obliquely in the direction of arrow Z6, arrow Z7 or arrow Z8, the first and second detecting members 6 and 7 are enabled to be operated at the same time as described above with reference to FIG. 9.

These procedures enable the first and second detecting members 6 and 7 to be operated and the slide position of the manipulating member 12 is detected.

Further, during the sliding action of the manipulating member 12, a signal is sent to the first and second motors 3 and 4 from a controller (not shown) to drive the first and second motors 3 and 4, and this driving force is transmitted to the rotation shafts 6b and 7b of the first and second detecting members 6 and 7.

Then, the driving force of the first and second motors 3 and 4 acts as a reactionary force (kinesthetic sense or haptic sense) to the sliding motion of the manipulating member 12.

Thus, the kinesthetic sense provided by the first and second motors 3 and 4 is transmitted from the first and second gears 8 and 9 to the manipulating member 12 via the first and second drive members 16 and 17 and the sliding member 13.

FIG. 10 illustrates another input device, which is a second preferred embodiment of the present invention. In this second embodiment, the first and second detecting members 6 and 7 consist of linearly manipulated electrical parts such as slide variable resistors or slide switches. Their manipulable parts 6c and 7c are supported by supports 16e and 17e of the first and second drive members 16 and 17, and the manipulable parts 6c and 7c slide with the linear shifting of the first and second drive members 16 and 17 to operate linearly manipulated electrical parts, which are the first and second detecting members 6 and 7.

Since other aspects of the configuration are the same as their respective counterparts in the first preferred embodiment described above, the same reference numerals will be assigned to respectively the same elements, whose description will be dispensed with.

These configurations allow either rotarily or linearly manipulated parts can be used as the first and second detecting members 6 and 7, providing correspondingly greater freedom of choice.

FIG. 11 illustrates another input device, which is a third preferred embodiment of the invention. In this third embodiment, the sliding member 13 is provided with the first engaging means 14a and 14b consisting of a pair of slits 13d, and the first and second drive members 16 and 17 are provided with the second engaging means 18a and 18b consisting of protrusions 16f and 17f inserted into and engaged with the slits 13d.

During the sliding motion of the sliding member 13 accompanying the sliding shift of the manipulating member 12, the second engaging means 18a and 18b alter their respective engaging positions with the first engaging means 14a and 14b to enable the first and second drive members 16 and 17 to shift linearly.

Since other aspects of the configuration are the same as their respective counterparts in the first preferred embodiment described above, the same reference numerals will be assigned to respectively the same elements, whose description will be dispensed with.

FIG. 12 illustrates another input device, which is a fourth preferred embodiment of the invention. The configuration of this fourth embodiment is such that the first and second drive members 16 and 17 respectively have linearly extending arms 16a and 17a, bends 16g and 17g at a right angle to these arms 16a and 17a, and the second engaging means 18a and 18b provided on these bends 16g and 17g.

Since other aspects of the configuration are the same as their respective counterparts in the first preferred embodiment described above, the same reference numerals will be assigned to respectively the same elements, whose description will be dispensed with.

This configuration enables the first and second motors 3 and 4 and the first and second detecting members 6 and 7 to be arranged in different positions from their respective counterparts in the first preferred embodiment, providing correspondingly greater freedom of arrangement.

FIG. 13 and FIG. 14 illustrate another input device, which is a fifth preferred embodiment of the invention. In this fifth embodiment, the planar part 13a of the sliding member 13 is provided with a plurality of holes 13e, and balls 20 are inserted into these holes 13e, and these balls 20 shift while remaining in contact with the first and second guiding members 10 and 11 to smoothen the sliding motion of the sliding member 13.

Since other aspects of the configuration are the same as their respective counterparts in the first preferred embodiment described above, the same reference numerals will be assigned to respectively the same elements, whose description will be dispensed with.

Although the foregoing embodiments of the invention are supposed to use kinesthetic sensing motors, the invention can as well be applied to an input device for no arrangement for kinesthetic sensing, using no such motors.

Also, though the foregoing embodiments are supposed to use gear mechanisms for the transmission of rotary motions, frictional means or other elements may as well be used for the transmission of rotary motions.

In the input device according to the present invention, when the manipulating member 12 slides, the sliding member 13 slides in the same direction as the manipulating member 12, and the respective engaging positions of the first and second drive members 16 and 17 are made changeable to enable each of the first and second drive members 16 and 17 to shift linearly, the linear shifting of the first and second drive members 16 and 17 enabling the first and second detecting members 6 and 7 to be operated. Accordingly, the drive members 16 and 17 linearly shift along with the sliding of the sliding member 12, eliminating the need to rotate arc-shaped interlocked members in the conventional configuration and making it possible to reduce the required space in the longitudinal direction, resulting in an input device made more compact in the longitudinal dimension.

What is claimed is:

1. An input device provide with a manipulating member slidable in any direction in a full 360-degree range from an initial position, a sliding member slidable together with the manipulating member on a plane normal to an axial direction of the manipulating member, at least a pair of first and second drive members linearly slidable along with motion of the sliding member and arranged at a right angle to each other, and first and second detecting members respectively operated by the first and second drive members, wherein, during sliding of the manipulating member, the sliding member slides in the same direction as the manipulating member, wherein the sliding member can alter engaging positions of the sliding member and the manipulating member with the first and second drive members to enable each of the first and second drive members to shift linearly, and wherein the linear shifting of the first and second drive members enables the first and second detecting members to be operated.

2. The input device according to claim 1, wherein the sliding member has a planar part and a pair of first engaging mechanism arranged at a right angle to each other, wherein the sliding member is slid as a top and a bottom of the planar part are guided by a guiding member, wherein an engaging mechanism provided on each of the first and second drive members engages with each of the first engaging mechanisms, and wherein each of the first and second drive members shifts linearly enabling the second engaging mechanism to alter respective engaging positions with the first engaging mechanism.

3. The input device according to claim 2, wherein the first engaging mechanisms are formed of a pair of slits provided on the planar part and extending at a right angle to each other, wherein the first and second drive members are arranged extending at a right angle to the slits, wherein the second engaging mechanism provided on the drive members are formed of stubs engaging with the slits, and wherein each of the first and second drive members linearly shifts enabling the stubs to alter respective engaging positions with the slits.

4. The input device according to claim 3, wherein the planar part has a plurality of holes, into which balls are inserted, and wherein the balls cause the planar part to slide while remaining in contact with the guiding member.

5. The input device according to claim 3, wherein a motor to transmit a kinesthetic sense to the manipulating member is provided, matching each of the first and second drive members.

6. The input device according to claim 2, wherein the first engaging mechanisms are formed of a pair of rod-shaped guide rails provided on the planar part and extending at a right angle to each other, wherein the first and second drive members are arranged extending at a right angle to the guide rails, wherein the second engaging mechanism provided on the drive members are formed of holds for holding the guide rails, and wherein each of the first and second drive members linearly shifts enabling the holds to alter respective engaging positions with the guide rails.

7. The input device according to claim 6, wherein the planar part has a plurality of holes, into which balls are inserted, and wherein the balls cause the planar part to slide while remaining in contact with the guiding member.

8. The input device according to claim 6, wherein a motor to transmit a kinesthetic sense to the manipulating member is provided, matching each of the first and second drive members.

9. The input device according to claim 2, wherein the planar part has a plurality of holes, into which balls are inserted, and wherein the balls cause the planar part to slide while remaining in contact with the guiding member.

10. The input device according to claim 9, further provided with a regulating mechanism that causes the first and second drive members to linearly shift.

11. The input device according to claim 1, further provided with a regulating mechanism that causes the first and second drive members to linearly shift.

12. The input device according to claim 1, wherein the detecting members have linearly manipulated electric parts, and wherein manipulable parts of the linearly manipulated electric parts are linearly manipulated by linear shifting of the drive members.

13. The input device according to claim 1, wherein the detecting members have rotarily manipulated electrical parts, and wherein rotation shafts of the rotarily manipulated electrical parts are rotationally manipulated by the linear shifting of the drive members.

14. The input device according to claim 13, wherein teeth provided on the drive members are meshed with gears fitted to the rotation shafts, and wherein the teeth rotate the rotation shafts via the gears.

15. The input device according to claim 14, wherein a motor to transmit a kinesthetic sense to the manipulating member is provided, matching each of the first and second drive members.

16. The input device according to claim 1, wherein a motor to transmit a kinesthetic sense to the manipulating member is provided, matching each of the first and second drive members.

17. The input device according to claim 16, wherein a gear fitted to each of the rotation shafts of the motors is engaged with each of the teeth provided on the first and second drive members, and wherein a kinesthetic sense is transmitted to the manipulating members via the gears, the drive members and the sliding member.

18. The input device according to claim 16, further provided with a casing, wherein the manipulating members protrude from a front wall of the casing, and wherein the detecting members and the motors are housed in the casing.

19. The input device according to claim 18, wherein the detecting members and the motors are arranged in a lower part of the sliding member.

20. The input device according to claim 16, wherein the motors are arranged in a state in which axes of the motors are arranged at a right angle to extending directions of the drive members.

* * * * *

UNITED STATES PATENT AND TRADEMARK OFFICE
CERTIFICATE OF CORRECTION

| | |
|---|---|
| PATENT NO. | : 6,796,201 B2 |
| APPLICATION NO. | : 10/191204 |
| DATED | : September 28, 2004 |
| INVENTOR(S) | : Mikio Onodera |

It is certified that error appears in the above-identified patent and that said Letters Patent is hereby corrected as shown below:

<u>In the Claims</u>

Column 12, in claim 1, line 1, after "input device" delete "provide" and substitute --provided-- in its place.

Signed and Sealed this

Twenty-fifth Day of July, 2006

JON W. DUDAS
*Director of the United States Patent and Trademark Office*